(12) United States Patent
Wu et al.

(10) Patent No.: US 11,543,117 B2
(45) Date of Patent: Jan. 3, 2023

(54) LIGHTING SHOWER

(71) Applicant: Purity (Xiamen) Sanitary Ware Co., Ltd., Xiamen (CN)

(72) Inventors: James Wu, Taichung (TW); Alex Wu, Taichung (TW); Ce-Wen Yang, Xiamen (CN); Ching-Yin Wu, Taichung (TW)

(73) Assignee: PURITY (XIAMEN) SANITARY WARE CO., LTD., Xiamen (CN)

( * ) Notice: Subject to any disclaimer, the term of this patent is extended or adjusted under 35 U.S.C. 154(b) by 126 days.

(21) Appl. No.: 17/126,602

(22) Filed: Dec. 18, 2020

(65) Prior Publication Data
US 2022/0113020 A1   Apr. 14, 2022

(30) Foreign Application Priority Data

Oct. 13, 2020 (TW) .................................. 109135337

(51) Int. Cl.
*F21V 33/00* (2006.01)
*B05B 1/18* (2006.01)
(Continued)

(52) U.S. Cl.
CPC ............ *F21V 33/004* (2013.01); *B05B 1/185* (2013.01); *F03B 13/00* (2013.01); *F21S 9/028* (2013.01);
(Continued)

(58) Field of Classification Search
CPC .................................. B05B 1/18; F21V 33/004
See application file for complete search history.

(56) References Cited

U.S. PATENT DOCUMENTS

2011/0216526 A1   9/2011 Li
2012/0170424 A1   7/2012 Zhou et al.

FOREIGN PATENT DOCUMENTS

CN   101628263 A   * 1/2010
CN   201375938 Y   * 1/2010
(Continued)

OTHER PUBLICATIONS

Extended European Search Report for European Application No. 21191455.1, dated Jan. 26, 2022.
Taiwanese Search Report for Taiwanese Application No. 109135337, dated Jun. 8, 2021, with an English translation.

*Primary Examiner* — Mariceli Santiago
(74) *Attorney, Agent, or Firm* — Birch, Stewart, Kolasch & Birch, LLP

(57) ABSTRACT

A lighting shower includes a body, a lighting device, a control module, and a hydraulic power generating device. The body has a first portion and a second portion facing opposite directions and includes an inlet tube and an outlet cover plate disposed on the second portion. The lighting device includes a transparent cover disposed on the first portion and a light-emitting element disposed in the transparent cover. The control module includes a storage battery and a controller electrically connected to the light-emitting element and adapted to control the light-emitting element to turn on or turn off. The water flows into a first chamber of the body from the inlet tube and through the hydraulic power generating device out from the outlet cover plate. The hydraulic power generating device is electrically connected to the control module to output an electrical energy to the storage battery for storage for providing an electricity required by the lighting device.

7 Claims, 7 Drawing Sheets

(51) Int. Cl.
  *F03B 13/00* (2006.01)
  *F21S 9/02* (2006.01)
  *F21S 9/04* (2006.01)
  *F21V 23/00* (2015.01)
  *F21V 23/04* (2006.01)
  *H02K 7/18* (2006.01)
  *H02K 11/00* (2016.01)

(52) U.S. Cl.
  CPC ............ *F21S 9/046* (2013.01); *F21V 23/003* (2013.01); *F21V 23/0464* (2013.01); *H02K 7/1823* (2013.01); *H02K 11/0094* (2013.01)

(56) References Cited

FOREIGN PATENT DOCUMENTS

| | | | | |
|---|---|---|---|---|
| CN | 202162091 U | * | 3/2012 | |
| CN | 202410862 U | | 9/2012 | |
| CN | 202803445 U | | 3/2013 | |
| CN | 105750104 A | * | 7/2016 | ........... B05B 1/1636 |
| CN | 106622706 A | * | 5/2017 | |
| CN | 209549742 U | | 10/2019 | |
| CN | 106622706 B | | 12/2019 | |
| DE | 201 01 460 U1 | | 7/2001 | |
| KR | 20090120247 A | * | 11/2009 | |
| TW | M535795 U | | 1/2017 | |
| WO | WO-2010135869 A1 | * | 12/2010 | ............... B05B 1/18 |

* cited by examiner

LIGHTING SHOWER

BACKGROUND OF THE INVENTION

Technical Field

The present invention relates generally to a shower, and more particularly to a shower, which could provide a lighting performance.

Description of Related Art

Nowadays, most people use a shower to wash the body. In addition to the advantage of greatly reducing the shower water, the water-column sprayed from the shower can also form a massage effect on the human body. A user can also adjust the strength of the water-column through the shower to increase a comfort during the shower. In addition to increase the comfort during the shower through the above ways, it is known that there are showers with light-emitting devices on the market that can illuminate the water-column sprayed from the shower through the light generated by the light-emitting device, thereby to form a water-column with colors, which provides the user with a special visual experience.

Typically, the light-emitting device of the conventional shower is directly connected to an external power supply to generate a light. However, the power consumed by the light-emitting device inevitably causes additional electricity expenses for the user. In addition, the light-emitting device of the conventional shower is generally disposed inside the shower and adjacent to a shower nozzle, so as to emit light through the outlet hole of the nozzle. However, most of the light emitted by the light-emitting device is covered by the nozzle, the lighting effect is not significant. Therefore, the conventional shower still has room for improvement.

BRIEF SUMMARY OF THE INVENTION

In view of the above, the primary objective of the present invention is to provide a lighting shower, which could generate electricity through a water flow for a light-emitting device to emit light and provide a better lighting effect.

The present invention provides a lighting shower, including a body, a lighting device, a control module, and a hydraulic power generating device. The body has a first portion and a second portion which face opposite directions and includes an inlet tube and an outlet cover plate, wherein the inlet tube is disposed on the first portion of the body and is adapted to be connected to an external water source. The outlet cover plate is disposed on the second portion of the body. An inside of the body has a first chamber and a second chamber. The first chamber and the second chamber are separated. The first chamber communicates with the inlet tube. The lighting device includes a light-emitting element and a transparent cover disposed on the first portion of the body, wherein the light-emitting element is disposed in the transparent cover. The control module includes a controller and a storage battery. Both the storage battery and the controller are disposed in the second chamber. The controller is electrically connected to the light-emitting element and is adapted to control the light-emitting element to turn on or turn off. The storage battery is adapted to provide an electricity required by the lighting device. The hydraulic power generating device is disposed in the first chamber. The water flows into the first chamber from the inlet tube, and then flows through the hydraulic power generating device out from the outlet cover plate. The hydraulic power generating device is electrically connected to the control module to output an electrical energy to the storage battery for storage.

With the aforementioned design, the water flows into the first chamber via the inlet tube, and then flows through the hydraulic power generating device, thereby to generate and output the electric energy to the storage battery for storage and for the light-emitting element to emit light. Thus, the light-emitting element could emit light without an external power supply, saving energy and simplifying the structure of the appearance of the shower. In addition, the light-emitting element emits light through the transparent cover disposed on the first portion of the body, improving the problem of the poor lighting effect caused by a conventional light-emitting element emitting light through an outlet hole of a shower.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
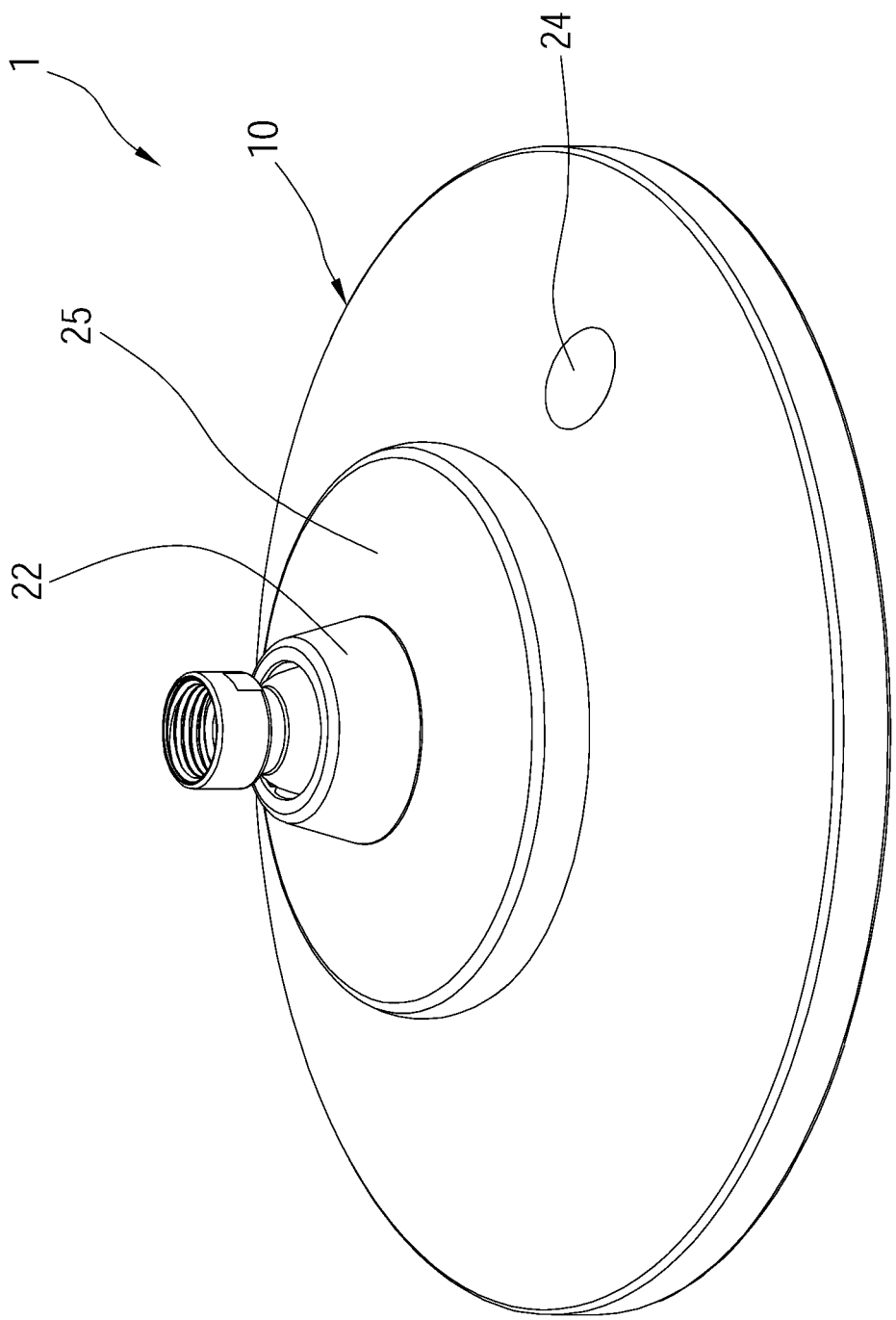
FIG. 1 is a perspective view of the lighting shower according to a first embodiment of the present invention.
Figure 2:
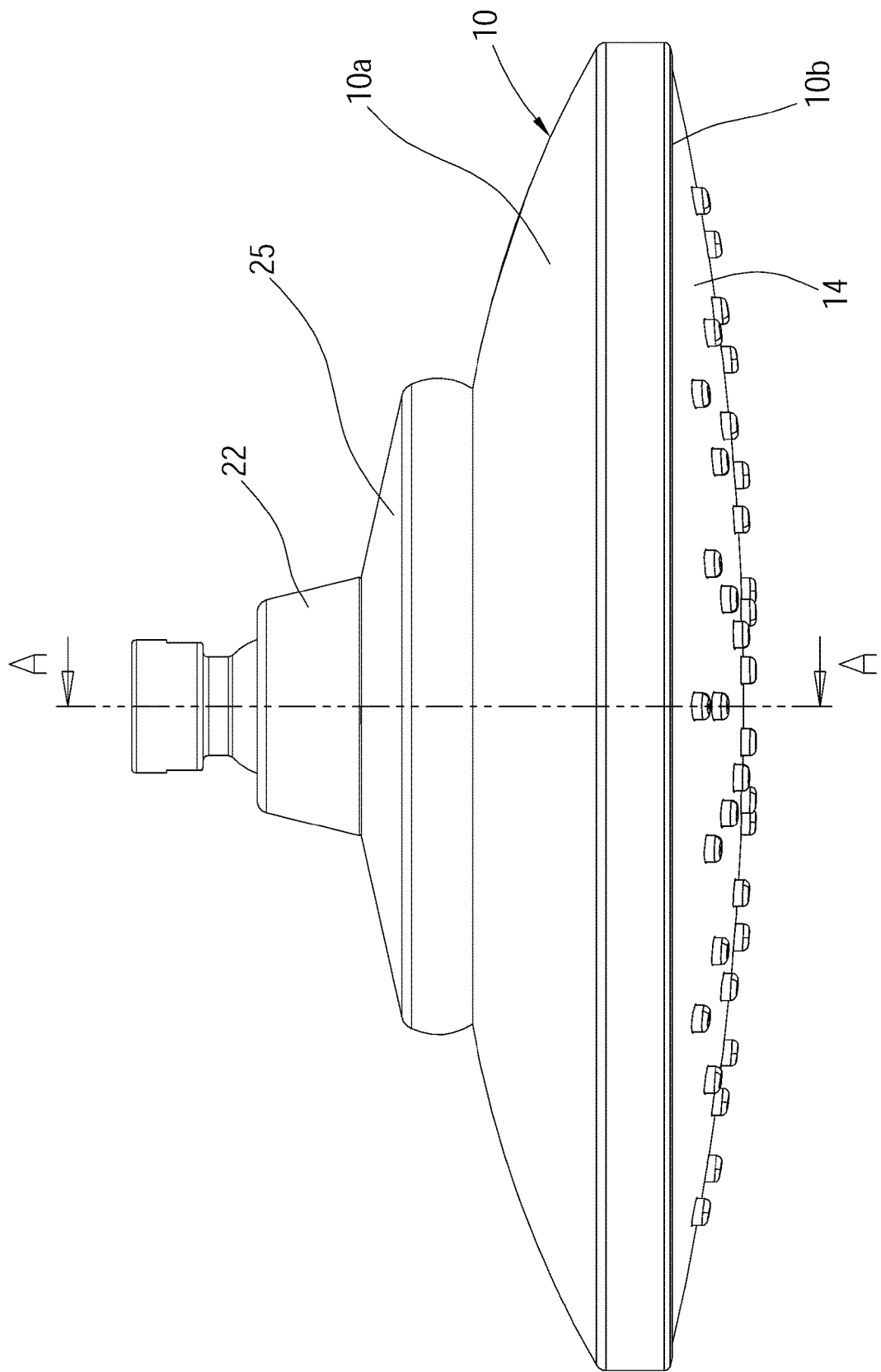
FIG. 2 is a side view of the lighting shower according to the first embodiment of the present invention.

A lighting shower 1 according to a first embodiment of the present invention is illustrated in FIG. 1 to FIG. 6 and includes a body 10, a lighting device 20, a control module 40, and a hydraulic power generating device 60. As shown in FIG. 1 and FIG. 2, the body 10 has a first portion 10*a* and a second portion 10*b*, which face opposite directions, and includes an inlet tube 12 and an outlet cover plate 14, wherein the inlet tube 12 is disposed on the first portion 10*a* and is adapted to be connected to an external water source. The outlet cover plate 14 is disposed on the second portion 10*b*.

Figure 3:
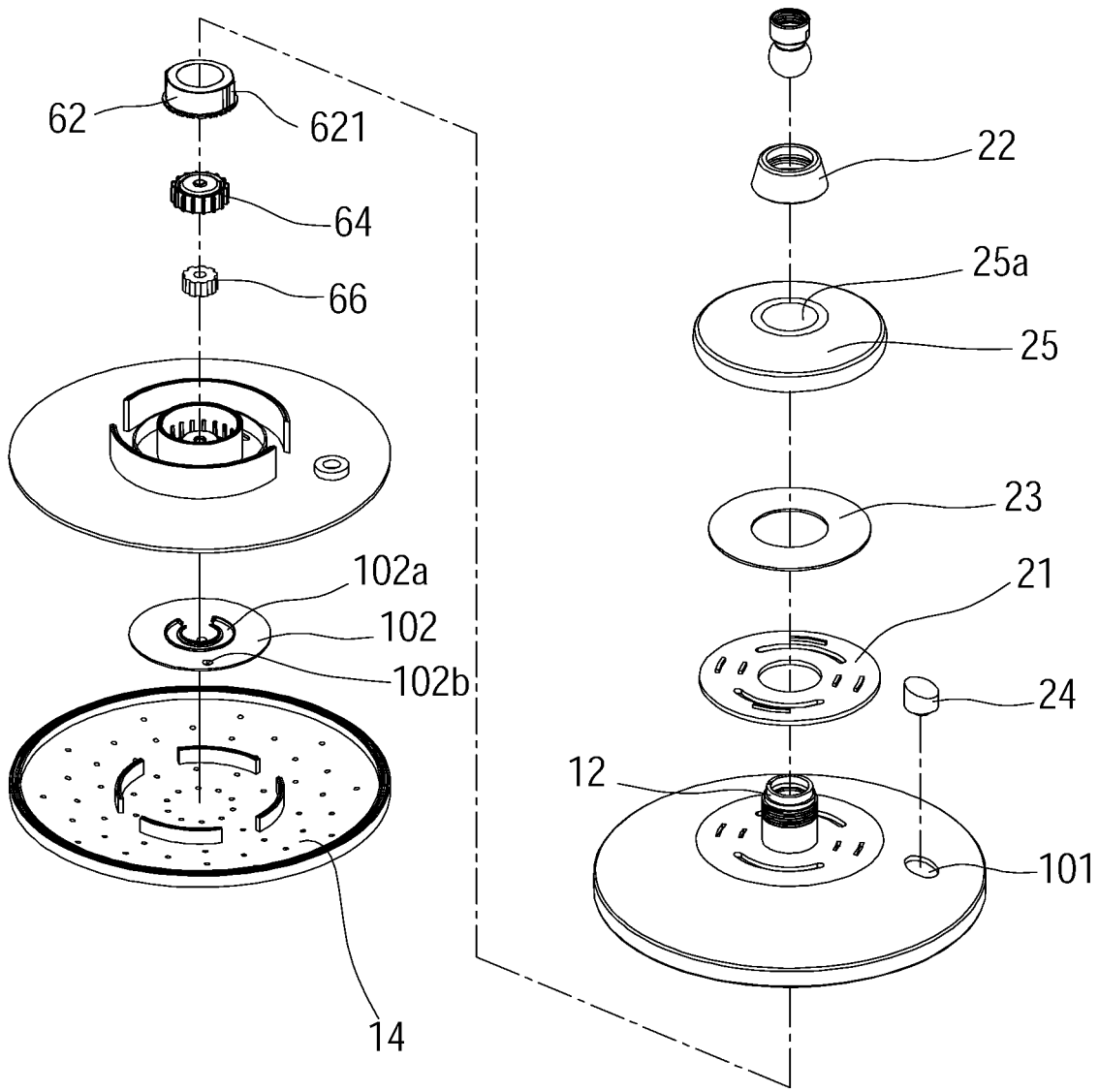
FIG. 3 is an exploded diagram view of the lighting shower according to the first embodiment of the present invention.

As shown in FIG. 2 and FIG. 3, the lighting device 20 includes a mounting seat 21, a fixing member 22, a light-emitting element 23, a photosensitive element 24, and a transparent cover 25. The first portion 10*a* of the body 10 has a mounting hole 101. The photosensitive element 24 penetrates through the mounting hole 101. A side of the mounting seat 21 is connected to the first portion 10*a* of the body 10, and another side of the mounting seat 21 is adapted to mount the light-emitting element 23. The transparent cover 25 has a perforation 25*a* and fits around the inlet tube 12 by the perforation 25*a* to be disposed on the first portion 10*a* of the body 10. Both the mounting seat 21 and the light-emitting element 23 are disposed in the transparent cover 25. An end of the inlet tube 12 is connected to the first portion 10a of the body 10, and another end of the inlet tube 12 is engaged with the fixing member 22 to locate the transparent cover 25 between the fixing member 22 and the body 10. In the current embodiment, an outer surface of the inlet tube 12 has an external thread. The fixing member 22 has an internal thread corresponding to the external thread of the inlet tube 12, thus, the fixing member 22 could be connected to the inlet tube 12 by screwing. In addition, in the current embodiment, the light-emitting element 23 takes an LED as an example and the photosensitive element 24 takes a photoresistor as an example. In other embodiments, the light-emitting element 23 could be other light-emitting elements such as a halogen lamp, and the photosensitive element 24 could be other photosensitive elements such as an infrared sensor, an ultraviolet sensor, a phototube, or a phototransistor.

Figure 4:
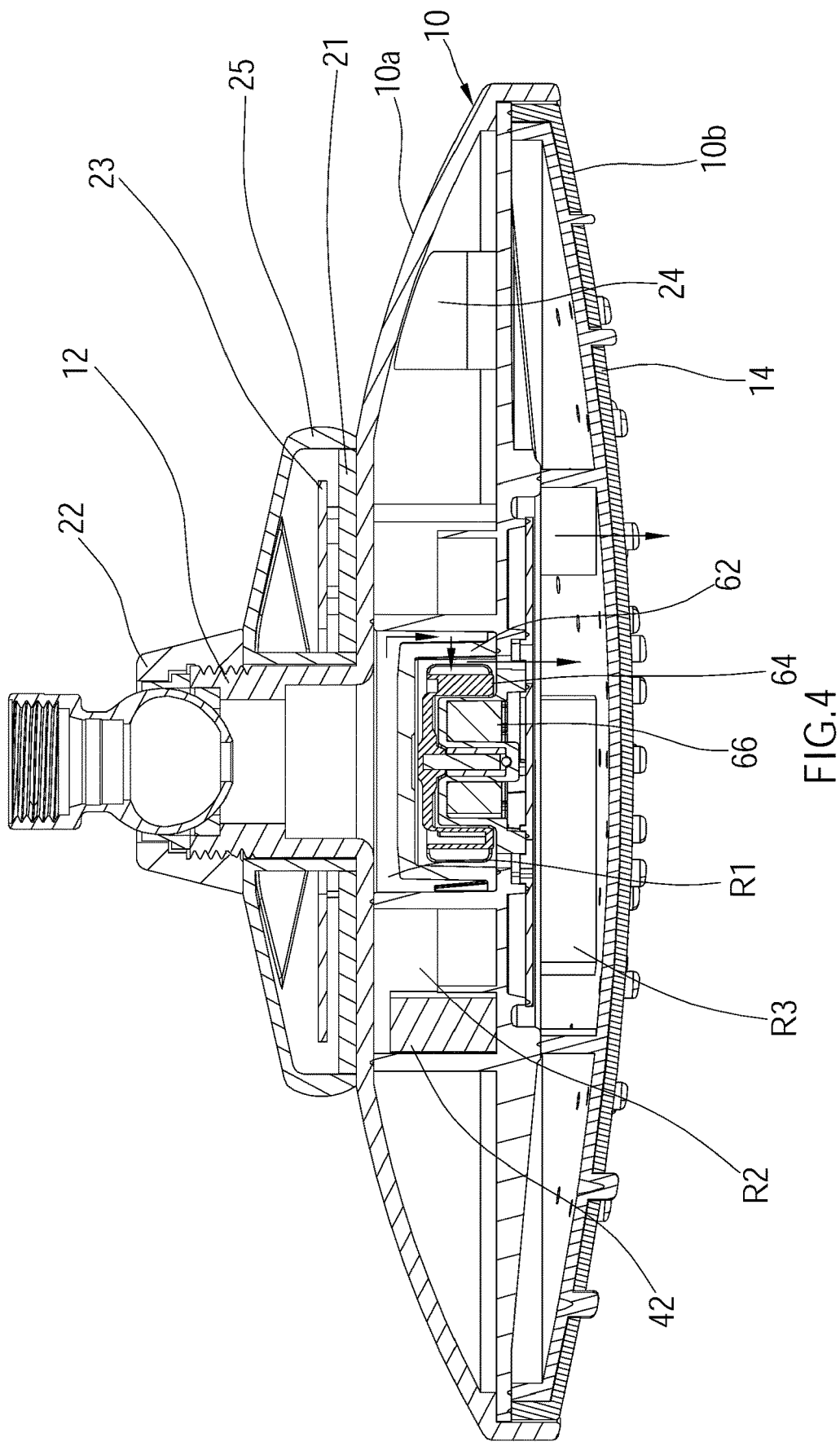
FIG. 4 is a cross-sectional view along the A-A line in FIG. 2.
Figure 5:
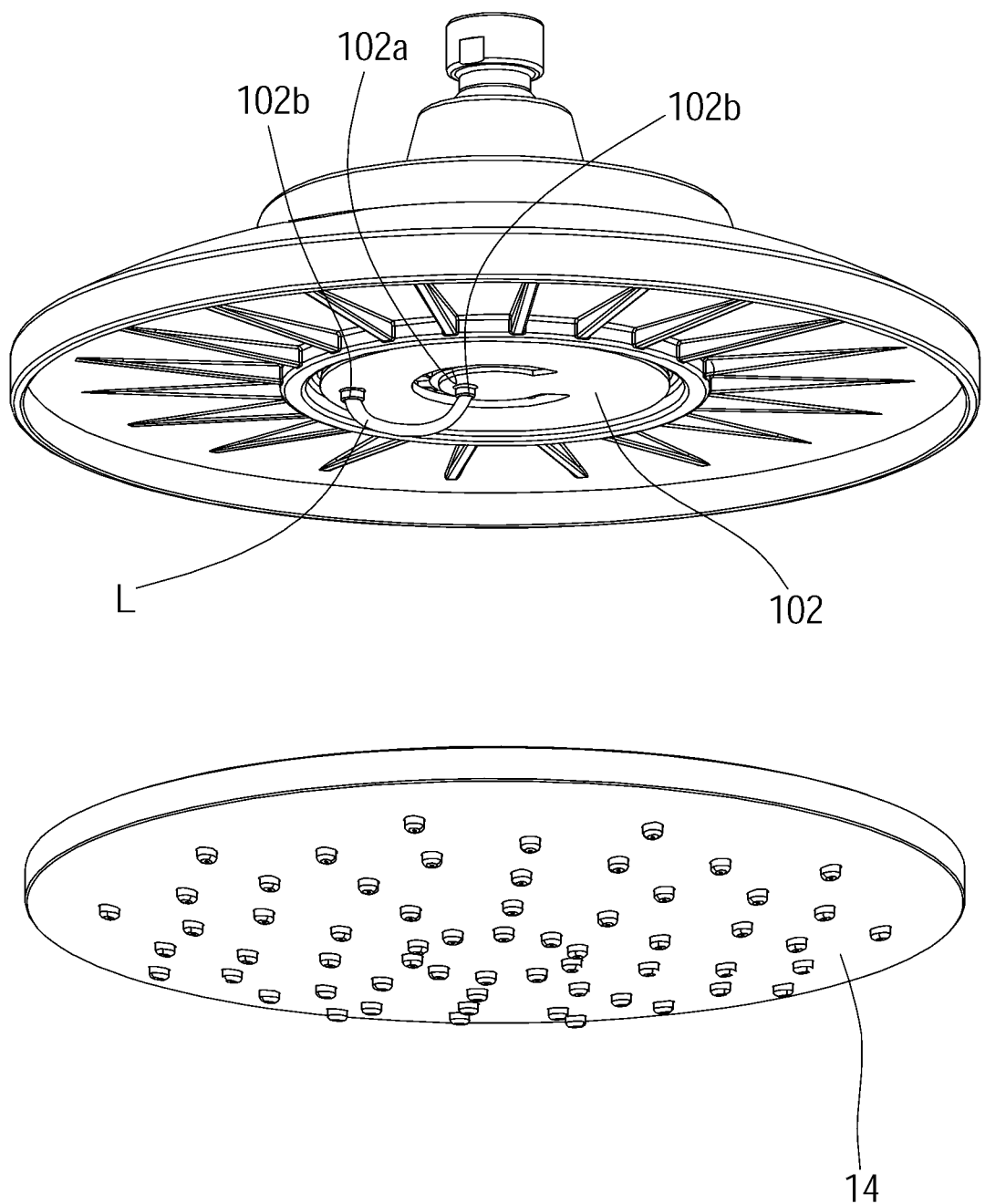
FIG. 5 is a partially exploded view of the lighting shower according to the first embodiment of the present invention.
Figure 6:
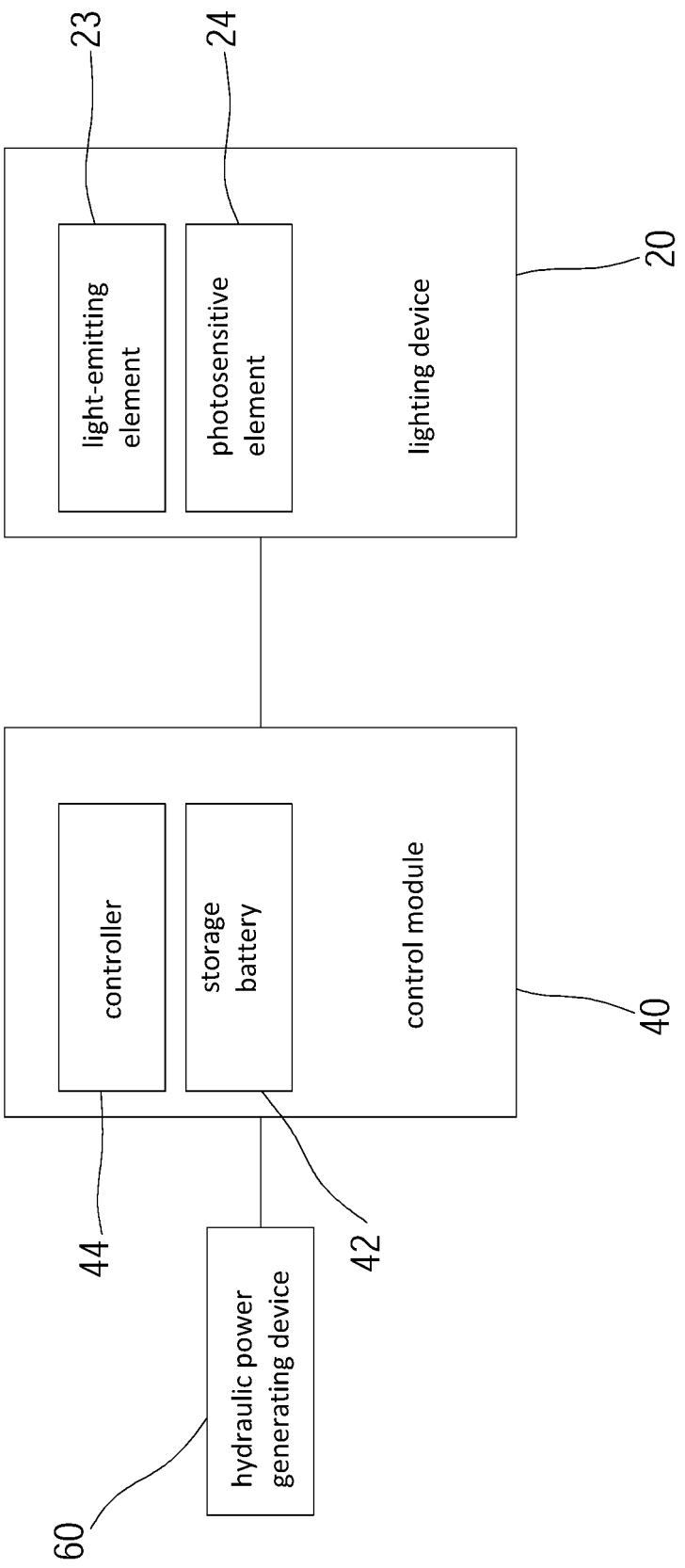
FIG. 6 is a block diagram of the lighting device, the control module, and the hydraulic power generating device according to the first embodiment of the present invention.

As shown in FIG. 3 to FIG. 5, the body 10 includes a blocking plate 102 disposed in the body 10, wherein the blocking plate 102 has a drain hole 102a. An inside of the body 10 has a first chamber R1, a second chamber R2, and a third chamber R3, wherein the first chamber R1 communicates with the inlet tube 12 and is adjacent to the second chamber R2. The first chamber R1 and the second chamber R2 are separated and are located on a same side of the blocking plate 102, and do not communicate with each other. The third chamber R3 is located between the blocking plate 102 and the outlet cover plate 14. The hydraulic power generating device 60 is disposed in the first chamber R1 and includes a cover cap 62, a magnet (not shown), an impeller 64, and a coil 66, wherein a side wall of the cover cap 62 has an oblique inlet 621. The impeller 64 is rotatably disposed in the cover cap 62. The coil 66 is fixed in the cover cap 62. The impeller 64 is linked with the magnet. In this way, the water flows into the first chamber R1 from the inlet tube 12 and then flows into the cover cap 62 through the oblique inlet 621 of the side wall of the cover cap 62 to contact with a blade of the impeller 64, driving the impeller 64 to rotate to convert the kinetic energy of the water into an electrical energy to output. The water flowing through the hydraulic power generating device 60 flows into the third chamber R3 through the drain hole 102a of the blocking plate 102 and then flows out through the outlet cover plate 14 for the user to use.

The control module 40 includes a storage battery 42 and a controller 44, wherein both the storage battery 42 and the controller 44 are disposed in the second chamber R2. The storage battery 42 is adapted to provide a power required by the lighting device 20. The hydraulic power generating device 60 is electrically connected to the control module 40 to output the electrical energy to the storage battery 42 for storage. The controller 44 is respectively and electrically connected to the light-emitting element 23 and the photosensitive element 24, and controls the light-emitting element 23 to emit light when an ambient brightness detected by the photosensitive element 24 is lower than a predetermined brightness or controls the light-emitting element 23 to turn off when the ambient brightness detected by the photosensitive element 24 is higher than the predetermined brightness. In this way, the lighting shower 1 could automatically provide the user with appropriate lighting when the ambient brightness is insufficient or automatically turn off the light-emitting element 23 when the ambient brightness is sufficient, achieving the effect of reducing the power waste. In addition, when the user uses the lighting shower 1 to take a shower, the hydraulic power generating device 60 could output the electric energy to the storage battery 42 for storage for the light-emitting element 23 to use. It is worth mentioning that, in the current embodiment, both the storage battery 42 and the controller 44 are disposed in the second chamber R2 as an example, however, the position of the storage battery 42 and the position of the controller 44 are not limited to be disposed in the second chamber R2. In other embodiments, the controller 44 could be disposed in the first chamber R1, the second chamber R2, or both of the first chamber R1 and the second chamber R2, and the storage battery 42 could be disposed in the first chamber R1, the second chamber R2, or both of the first chamber R1 and the second chamber R2.

More specifically, as shown in FIG. 5, the blocking plate 102 has two wire holes 102b, wherein one of the wire holes 102b of the blocking plate 102 communicates with the first chamber R1 and the third chamber R3, and the other wire hole 102b of the blocking plate 102 communicates with the second chamber R2 and the third chamber R3. Thus, a wire L could be disposed in the third chamber R3 and be connected to the hydraulic power generating device 60 in the first chamber R1 and the control module 40 in the second chamber R2 by passing through the wire holes 102b respectively.

Figure 7:
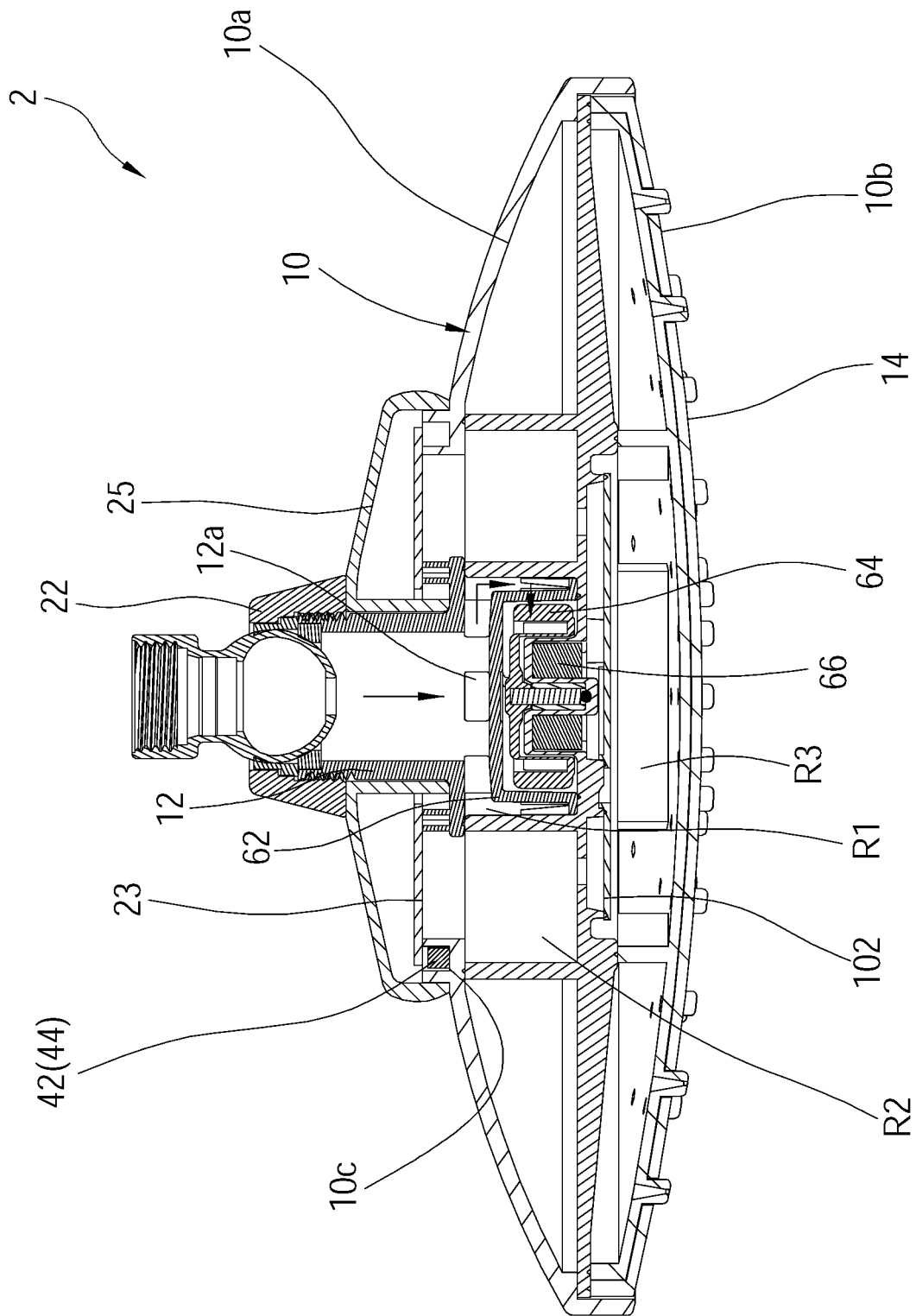
FIG. 7 is a sectional view of the lighting shower according to a second embodiment of the present invention.

A lighting shower 2 according to a second embodiment of the present invention is illustrated in FIG. 7 and has almost the same structure as the lighting shower 1 of the first embodiment, except that, in the current embodiment, a top of the cover cap 62 is connected to a side of the inlet tube 12 which is opposite to another side of the inlet tube connected to the external water source, wherein a plurality of side holes is formed at a junction between the inlet tube 12 and the cover cap 62. In this way, the water flows into the first chamber R1 through the side holes 12a from the inlet tube 12, and then flows into the cover cap 62 through the oblique inlet 621 of the side wall of the cover cap 62 to contact with the blade of the impeller 64, driving the impeller 64 to rotate to convert the kinetic energy of the water into the electrical energy to output. The water flowing through the hydraulic power generating device 60 flows into the third chamber R3 through the drain hole 102a of the blocking plate 102 and then flows out through the outlet cover plate 14 for the user to use. In addition, in the first embodiment of the present invention, both the storage battery 42 and the controller 44 are disposed in the second chamber R2 as an example. In the second embodiment of the present invention, the first portion 10a of the body 10 has a mounting groove 10c located in the transparent cover 25, thus, the storage battery 42 and the controller 44 are not limited to be disposed in the second chamber R2, but also could be disposed in the mounting groove 10c.

In summary, the hydraulic power generating device 60 of the lighting shower 1 of the present invention could convert the kinetic energy of the water into the electrical energy and output the electric energy to the storage battery 42 for storage for the light-emitting element 23 to use, so that the light-emitting element 23 could emit light without an external power supply, not only saving energy but also simplifying the structure of the appearance of the shower. In addition, the light-emitting element 23 emits light through the transparent cover 25 disposed on the first portion 10a of the body 10, improving the problem of the poor lighting effect caused by a conventional light-emitting element emitting light through an outlet hole of a shower. Moreover, the lighting shower 1 of the present invention could automatically provide the user with appropriate lighting when the ambient brightness is insufficient or automatically turn off the light-emitting element when the ambient brightness is sufficient, achieving the effect of reducing the power waste. Furthermore, there is no necessity for the user to turn on or turn off the light-emitting element during the shower, improving the convenience of operation.

It must be pointed out that the embodiments described above are only some preferred embodiments of the present invention. All equivalent structures which employ the concepts disclosed in this specification and the appended claims should fall within the scope of the present invention.

What is claimed is:

1. A lighting shower, comprising:
a body having a first portion and a second portion which face opposite directions and comprising an inlet tube and an outlet cover plate, wherein the inlet tube is disposed on the first portion of the body and is adapted to be connected to an external water source; the outlet cover plate is disposed on the second portion of the body;
a lighting device comprising a light-emitting element and a transparent cover, wherein the transparent cover is disposed on the first portion of the body; the light-emitting element is disposed in the transparent cover;
a control module comprising a controller and a storage battery, wherein the controller is electrically connected to the light-emitting element and is adapted to control the light-emitting element to turn on or turn off; the storage battery is adapted to provide an electricity required by the lighting device; and
a hydraulic power generating device disposed in the body, wherein a water flowing through the hydraulic power generating device from the inlet tube, and then flows out through the outlet cover plate; the hydraulic power generating device is electrically connected to the control module to output an electrical energy to the storage battery for storage;
wherein the light-emitting element and the transparent cover are located out of the body of the lighting shower to allow the lighting device to protrude from an outer surface of the first portion of the body.

2. The lighting shower as claimed in claim 1, wherein the lighting device comprises a photosensitive element; the controller is electrically connected to the photosensitive element and controls the light-emitting element to emit light when a brightness detected by the photosensitive element is lower than a predetermined brightness.

3. The lighting shower as claimed in claim 1, wherein the lighting device comprises a fixing member; the transparent cover has a perforation; the transparent cover fits around the inlet tube by the perforation; an end of the inlet tube is connected to the first portion of the body, and another end of the inlet tube is engaged with the fixing member, thereby to locate the transparent cover between the fixing member and the body.

4. The lighting shower as claimed in claim 1, wherein the hydraulic power generating device comprises a cover cap, a magnet, an impeller, and a coil; a side wall of the cover cap has an oblique inlet; the impeller is rotatably disposed in the cover cap; the coil is fixed in the cover cap; the impeller is linked with the magnet.

5. The lighting shower as claimed in claim 1, wherein the body has a first chamber and a second chamber therein; the first chamber and the second chamber are separated; the first chamber communicates with the inlet tube; the hydraulic power generating device is disposed in the first chamber; the controller is disposed in at least one of the first chamber and the second chamber; the storage battery is disposed in at least one of the first chamber and the second chamber; the body comprises a blocking plate disposed in the body; the blocking plate has a drain hole; the first chamber and the second chamber are located on a same side of the blocking plate; the water flows into the first chamber from the inlet tube, and then flows through the drain hole of the blocking plate, and flows out through the outlet cover plate.

6. The lighting shower as claimed in claim 5, wherein the body has a third chamber therein; the third chamber is located between the blocking plate and the outlet cover plate; the water flows into the first chamber from the inlet tube, and then flows through the drain hole of the blocking plate and the third chamber out through the outlet cover plate; the blocking plate has two wire holes, one of the wire holes communicates with the first chamber and the third chamber, and the other wire hole communicates with the second chamber and the third chamber.

7. The lighting shower as claimed in claim 2, wherein the photosensitive element comprises one of an infrared sensor, an ultraviolet sensor, a phototube, a phototransistor, or a photoresistor.

* * * * *